United States Patent [19]
Koga et al.

[11] Patent Number: 5,452,097
[45] Date of Patent: Sep. 19, 1995

[54] VIDEO DATA REPRODUCING APPARATUS FOR REPRODUCING VIDEO DATA AND METHOD THEREFOR

[75] Inventors: Yuzuru Koga; Satoshi Sonohara; Shigeki Furuta; Hitoshi Matsumoto, all of Kawasaki, Japan

[73] Assignee: Fujitsu Limited, Kawasaki, Japan

[21] Appl. No.: 104,652

[22] Filed: Aug. 11, 1993

[30] Foreign Application Priority Data

Nov. 2, 1992 [JP] Japan ............... 4-294662

[51] Int. Cl.$^6$ ............................................. H04N 5/76
[52] U.S. Cl. ........................... 358/342; 358/335; 360/33.1
[58] Field of Search ............... 358/342, 335, 310, 322, 358/311; 360/33.1, 35.1, 14.1, 14.2, 14.3; H04N 5/76, 9/79, 5/92

[56] References Cited

U.S. PATENT DOCUMENTS

| | | |
|---|---|---|
| 4,489,351 | 12/1984 | d'Alayer de Costemore d'Arc ............ 358/335 |
| 4,796,100 | 1/1989 | Sakaguchi ............ 358/342 |
| 4,816,925 | 3/1989 | Hayashi ............ 358/342 |
| 4,974,178 | 11/1990 | Izeki et al. ............ 360/14.1 |
| 5,172,242 | 12/1992 | Yamaguchi et al. ............ 358/342 |
| 5,218,672 | 6/1993 | Morgan et al. ............ 358/342 |
| 5,243,588 | 9/1993 | Maeda et al. ............ 358/342 |
| 5,274,463 | 12/1993 | Matsumoto et al. ............ 360/14.1 |

*Primary Examiner*—Tommy P. Chin
*Assistant Examiner*—Thai Tran
*Attorney, Agent, or Firm*—Staas & Halsey

[57] ABSTRACT

A video data reproducing apparatus and method therefor having a file controller section for controlling video data recorded on a first recording medium at random positions, and further, having a second recording medium for recording the video data in a serial manner. The apparatus includes a decision section for judging whether to select the video data of either the first recording medium or the second recording medium. A first reading section reads out the data of the first recording medium through the file controller section when the first recording medium is selected by the decision section, and a second reading section reads out the video data to a buffer memory from the second recording medium, without any intervention of the file controller section, when the second recording medium is selected by the decision section.

15 Claims, 6 Drawing Sheets

VIDEO DATA REPRODUCING APPARATUS FOR REPRODUCING VIDEO DATA AND METHOD THEREFOR

BACKGROUND OF THE INVENTION

The present invention relates to a video data reproducing apparatus for switching video data reading routines in response to a different kind of recording medium and method therefor.

In an image recording/reproducing apparatus, a moving object is picked up by a pick-up means, such as a CCD, to thereby obtain motion picture data in a plurality of frames, and the plurality of frames of motion pictorial data are converted into digital data and recorded in a recording medium. Simultaneously with the recording of the motion picture data, sounds which have been produced by an object are inputted thereinto by means of a microphone, and the audio data are converted into digital data and are recorded in the recording medium.

When images and sounds are reproduced by using the video data reproducing apparatus, the motion picture or video image data and sound or audio data are read out from the recording medium to display the images on a display means such as a CRT (cathode ray tube) and to output the sounds to loud speakers.

Magnetic discs such as HDDs, rewriting type or additional writing type magneto-optical discs (MO discs) and the like are well known as large capacity recording media onto which the video and audio data obtained by the user are recorded. In general, the access to the recording medium is controlled by an operating system and the data are stored or written at random for every data block having a constant length.

On the other hand, CD-ROMs (Compact Disc Read Only Memories), optical discs and the like are well known as large capacity recording medium onto which the data could be neither added nor rewritten by user. In general, in such kinds of recording media, the video and audio data are both continuously recorded during the manufacturing process for producing the medium.

FIG. 7 is a block diagram showing a structure of a reproduction processing apparatus for reproducing data from these different kinds of recording media according to the prior art. As shown in FIG. 7, the video and audio data of HDD 2 and CD-ROM 3 are under the control of a file controller section 1, reproduced by a reproduction processing section 7, displayed on a CRT 15 as the motion pictures on the basis of the video data, and outputted into loud speakers 16 as sounds on the basis of the audio data.

However, since the HDD 2 and the CD-ROM 3 are controlled by the common file controller section 1, although an output transfer speed of the data of the HDD 2 is high, an output transfer speed of the data of the CD-ROM 3 is relatively low. On the other hand, a reproduction speed of the reproduction processing section 7 is different from the above-described transfer speed.

Accordingly, the data of the HDD 2 may be reproduced for the motion picture, but since the data of the CD-ROM 3 can not follow the reproduction speed, there is a fear that some frames of the motion picture would be dropped and the video and audio data would be inconsistent with each other, resulting in faulty in motion picture reproduction.

In view of the foregoing defects, an object of the present invention is to provide a video reproducing apparatus which is capable of reproducing the data regardless of the transfer speed of the recording medium.

SUMMARY OF THE INVENTION

In order to attain this and other objects, a video data reproducing apparatus according to the present invention comprises:
- file controller means 1 for controlling video data comprising of a plurality of blocks;
- first recording means 2 for recording the video data at random for every block;
- a second recording means 3 for recording the video data in the order of arrangement of the blocks;
- first reading means 4 for reading desired video data from the video data recorded in the first recording means 2;
- second reading means 5 for reading desired video data from the video data recorded in the second recording means 3;
- decision means 6 for determining which video data of either the first recording means 2 or the second recording means 3 should be reproduced; and
- reproducing means 7 for the video data read out by either the first recording means 2 or the second recording means 3.

The first reading means 4 reads out the data stored in the first recording means 2 through the file controller means 1 in the case where the first recording means 2 is selected by the decision means 6. The second reading means 5 has a buffer memory 51 for reading video data of a latter block before completion of reproduction of video data of a former block recorded in the second recording means 3. When the second recording means 3 is selected by the decision means 6, the second reading means 5 reads out the video data from the second recording means 3 to the buffer memory 51 without intervention of the file controller means 1.

The second reading means 5 may comprise a command section for feeding out to the second recording means 3 an instant return command for being responsive when receiving a data reading command of the video data and before completion of a process of the command upon read-out of the video data into the buffer memory 51. The second recording means 3 may be a CD-ROM or the like and the data thereof may be read out in a serial manner by directly using the instant return command without intervention of the file controller means 1.

The file controller means 1 may control each block of the video data in a cluster unit, the file controller means 1 having a file allocation table for storing therein cluster numbers for showing how respective clusters are connected to each other in order, thereby controlling the respective clusters.

The first recording means 2 may comprise one of a magnetic disc and a magneto-optical disc whose data may be read out through the FAT file system including the file allocation table.

According to the present invention, it is possible to add audio data to the video data.

The reproduction means 7 may comprise a random access memory for storing the video and audio data and a processing section such as a A/D converter for converting these data into analog data and outputting the data to an image display section such as a CRT and an audio output section such as a loud speaker.

The first reading means 4 and the second reading means 5 may be a magnetic disc drive unit and a CD-RM drive unit, respectively for example.

In the case where the CD-ROM 3 as the second recording means 3 is allotted to a Q drive by, for example, an OS, the decision means 6 judges whether or not a file to be reproduced is present in the Q drive. If the file to be reproduced is not present in the Q drive, the medium is judged as the hard disc 2.

If the file to be reproduced is present in the Q drive, it is judged whether or not the sector number on the CD-ROM 3 of the file to be reproduced may be obtained. If the sector number may be obtained, the medium is judged as the CD-ROM 3.

The decision means 6 may determine data commands to be reproduced and inputted from a key board or the like.

According to the present invention, the decision means 6 determines which data should be reproduced either from the first recording means 2 for recording the video data at random or the second recording means 3 for recording the video data in a serial manner.

If the decision means 6 selects the first recording means 2, the first reading means 4 reads the data recorded in the first recording means 2 through the file controller means 1, and the reproduction means 7 reproduces the read data to the first reading means 4.

On the other hand, if the decision means 6 selects the second recording means 3, the second reading mean 5 reads out the video data from the second recording means 3 to the buffer memory 51 without intervention of the file controller means 1.

Since the buffer memory 51 reads out the video data of the latter block before the completion of reproduction of the video data of the former block recorded in the second recording means 3, the data transfer from the buffer memory 51 to the reproduction means 7 may follow the reproduction speed.

Also, even if the video data from the first recording means 2 are read out through the file controller means 1, it is possible to follow the reproduction speed to thereby carry out a suitable video reproduction.

According to the present invention, even if the data are recorded in the recording means at random or in a serial manner, regardless of the output transfer speed of the recording medium, it is possible to follow the reproduction speed to thereby carry out a suitable video reproduction.

DETAILED DESCRIPTION OF THE PREFERRED EMBODIMENTS

Figure 1:
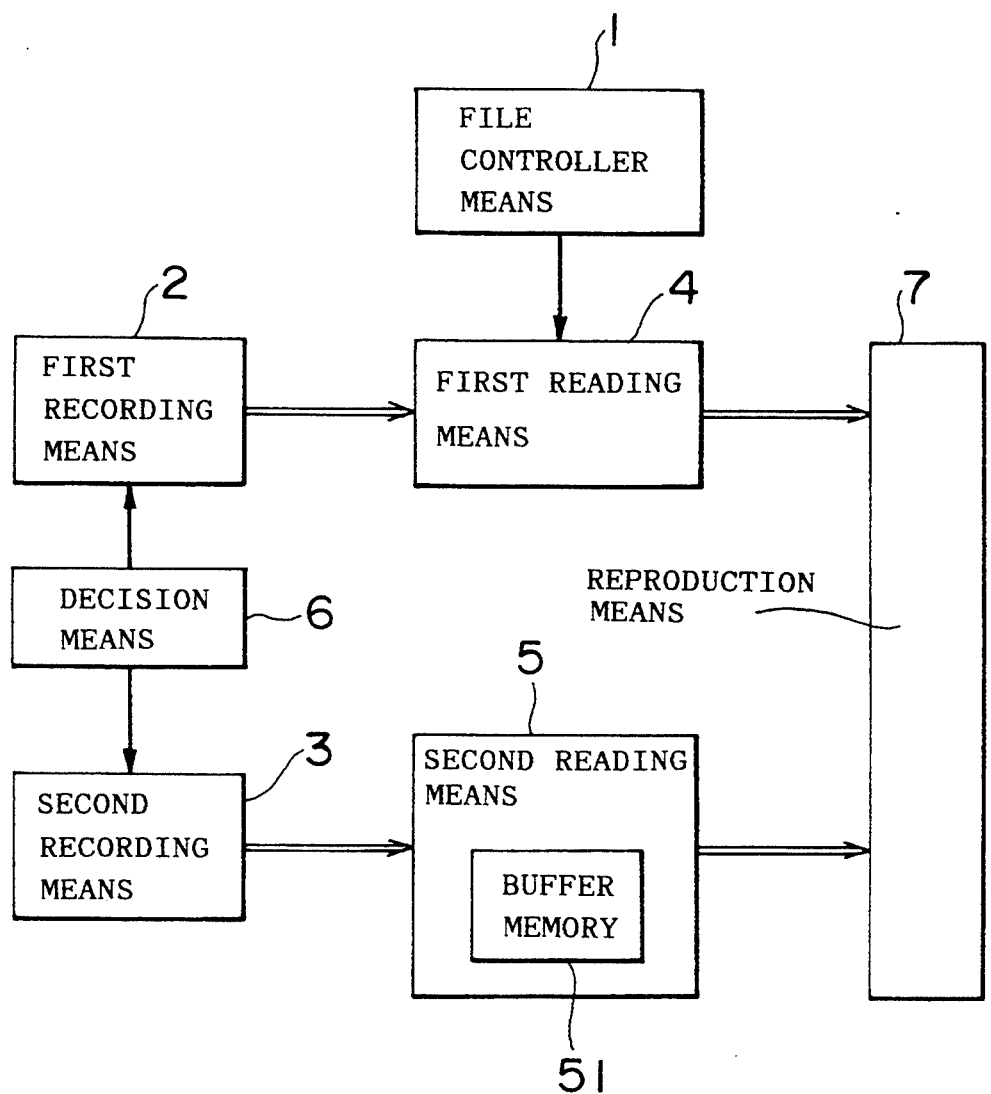
FIG. 1 is a diagram showing a concept of the invention.
Figure 2:
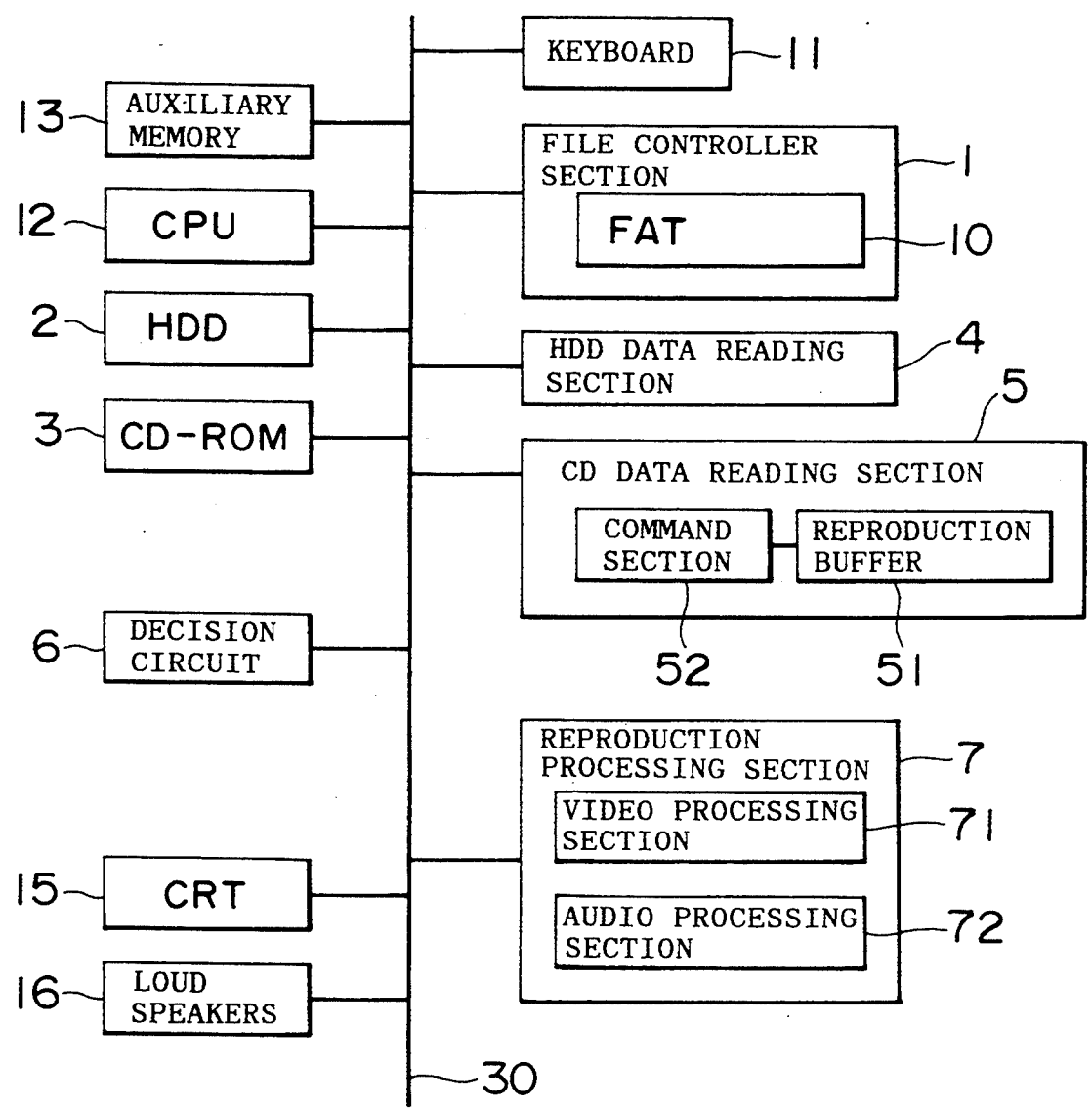
FIG. 2 is a block diagram showing a structure of a video reproducing apparatus according to one embodiment of the invention.

An embodiment of the present invention will now be described with reference to the accompanying drawings. FIG. 2 is a block diagram showing a structure of a video data reproducing apparatus in accordance with one embodiment of the invention.

In this apparatus, there is a common data bus 30 as shown in FIG. 2. A file controller section 1, first recording means such as a hard disc 2 and second recording means such as a CD-ROM 3 are connected to the common data bus 30.

The above-described video (or motion picture) data are digitized data which are obtained by picking up a moving object with a CCD (charge coupled device) and comprise any desired number of block length data. The above-described audio data are digitized data which are obtained by picking up sounds, generated from the object, with a microphone and which correspond to the video data.

The file controller section 1 controls the respective blocks of the video data in a cluster unit, and also controls the respective clusters with a file allocation table (FAT) 10. The file allocation table (FAT) 10 stores cluster numbers for showing how the respective clusters are connected in order. The file controller section 1 is capable of reading the data through the FAT file system including the FAT.

Figure 4:
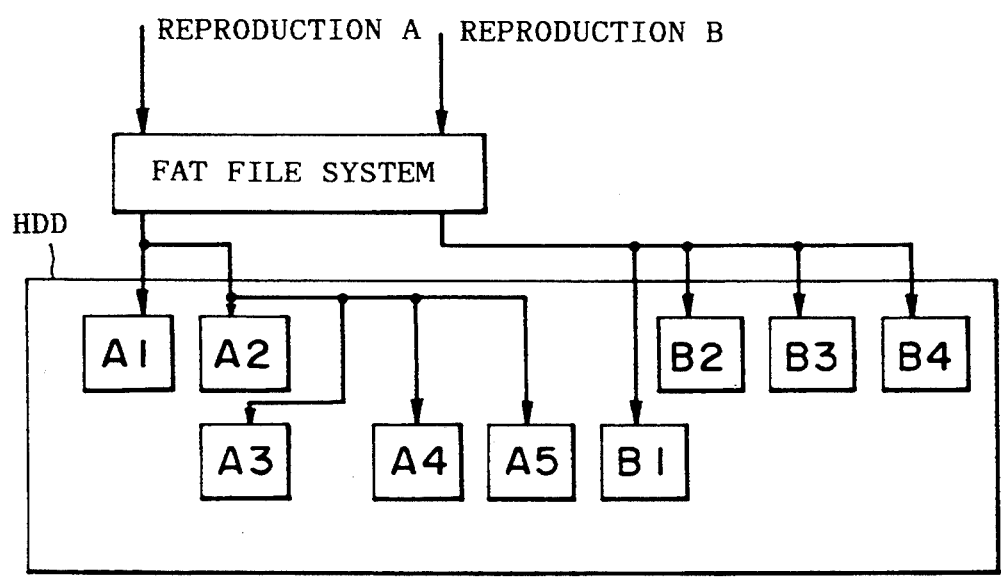
FIG. 4 is a diagram showing a data recording format on an HDD.

As shown in FIG. 4, the video data of the blocks A and B are divided into small block data A1–A5 and B1–B4, respectively, and are recorded at random positions in the hard disc 2. During the reproduction of the motion picture, under the control of the FAT file system of the above-described file controller section 1, the small block data A1–A5 and B1–B4 may be read out at a high speed as the video data A and the video data B.

Figure 3:
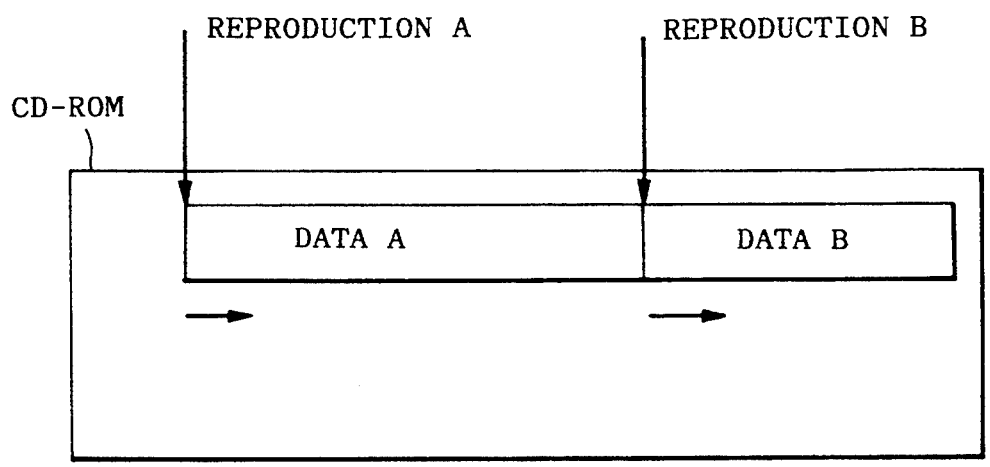
FIG. 3 is a diagram showing a data recording format on a CD-ROM.

As shown in FIG. 3, in the above-described CD-ROM 3, for example, the blocks A and B are recorded in a serial manner and the read-out of the video data of the block B are carried out before the video data of the block A have been reproduced.

Also, connected to the common data bus 30 are first reading means such as an HDD data reading section 4 for reading desired video data from the video data recorded in the hard disc 2 and second reading means such as a CD data reading section 5 for reading desired video data from the video data recorded in the CD-ROM 3.

Further, connected to the common data bus 30 are decision means such as a decision circuit 6 for determining which video data of the first recording means 2 or the second recording means 3 should be reproduced, and a video data reproducing means such as reproduction processing section 7 for reproducing the video data of either the hard disc 2 and the CD-ROM 3.

In the case where the hard disc 2 is selected by the decision circuit 6, the above-described HDD data recording section 4 may read out the data recorded in the hard disc 2 through the file controller section 1.

The CD data reading section 5 has a buffer memory 51 for reading out the video data before the video data of the former block recorded in the CD-ROM 3 have been reproduced and after the video data of the latter block have been read out. The CD data reading section 5 may read out the video data to the buffer memory 51 from the CD-ROM 3 without the control of the file controller section 1.

Also, the CD data reading section 5 has a command section 52 for reading the video data to the buffer memory 51 and for feeding to the CD-ROM 3 an instant return command for returning back a response even without the completion of the processing of the command if the latter is given. The CD data reading section 5 may read the data in a serial manner by using the instant return command without the control of the file controller section 1.

Incidentally, in the embodiment, it is assumed that the CD-ROM 3 be allotted to a Q drive.

The above-described decision circuit 6 is adapted to judge whether or not the file to be reproduced is present in the Q drive. In the case where no file to be drive is present in the Q drive, the hard disc 2 is selected. In the case where the file to be reproduced is present in the Q drive, it is judged whether or not the sector number on the file to be reproduced in the CD-ROM 3 may be obtained. If it is impossible to obtain the sector number, the hard disc 2 is selected. If the sector number is obtained, the CD-ROM 3 is selected.

The reproduction processing section 7 is adapted to reproduce the desired video and audio data and has an video processing section 71 for processing the video data and an audio processing section 72 for processing the audio data.

Both the video processing section 71 and the audio processing section 72 have a V-RAM (video random access memory) for storing therein the data and D/A converter (not shown) for converting the data into analog data and outputting the respective data of the V-RAM to the reproduction processing section 7.

Furthermore, connected to the common data bus 30 are a CRT (cathode ray tube) 15 for displaying the motion picture data thereon from the reproduction processing section 7 and loud speakers 16 for outputting the audio data from the reproduction processing section 7 as sounds.

Also, a key board 11 for inputting the commands by the operator and an auxiliary memory 13 for storing various data and file controller programs are connected to the common data bus 30.

A CPU (Central Processing Unit) 12 is connected to the common data bus 30 for controlling the respective sections and loading to the file controller section 1 a file control program stored in the auxiliary memory 13.

Figure 5:
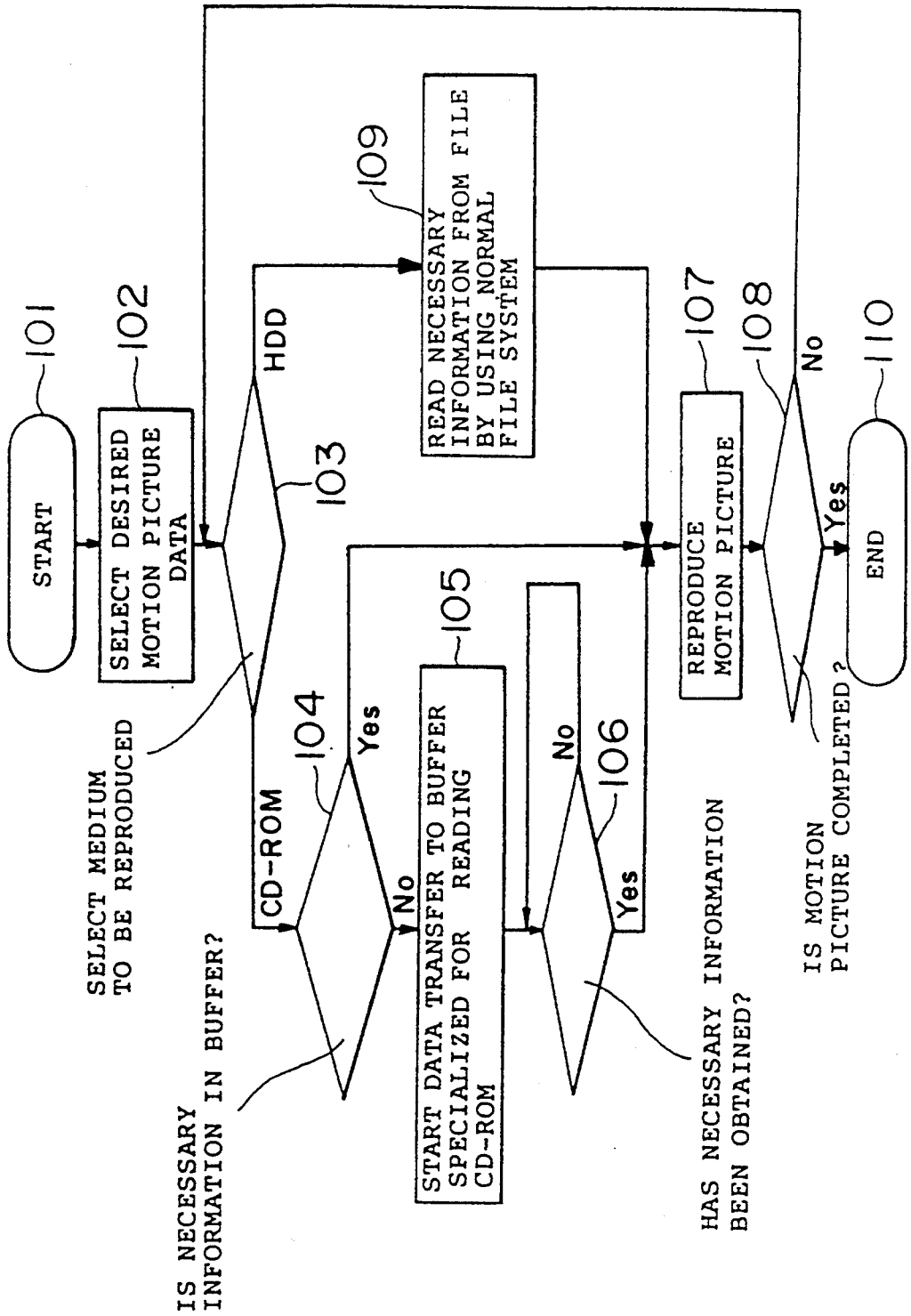
FIG. 5 is a flowchart of the process according to the embodiment.

The process of the thus constructed video data reproducing apparatus will be described using FIG. 5.

First of all, when a data reading command is inputted from the key board 11, the CPU 12 loads the file control program into the file controller section 1 from the auxiliary memory 13.

Subsequently, the process is started (step 101) and the operator selects desired motion picture data (step 102).

Then, the decision circuit 6 determines whether data should be produced from either the hard disc 2 or the CD-ROM 3 (step 103).

Figure 6:
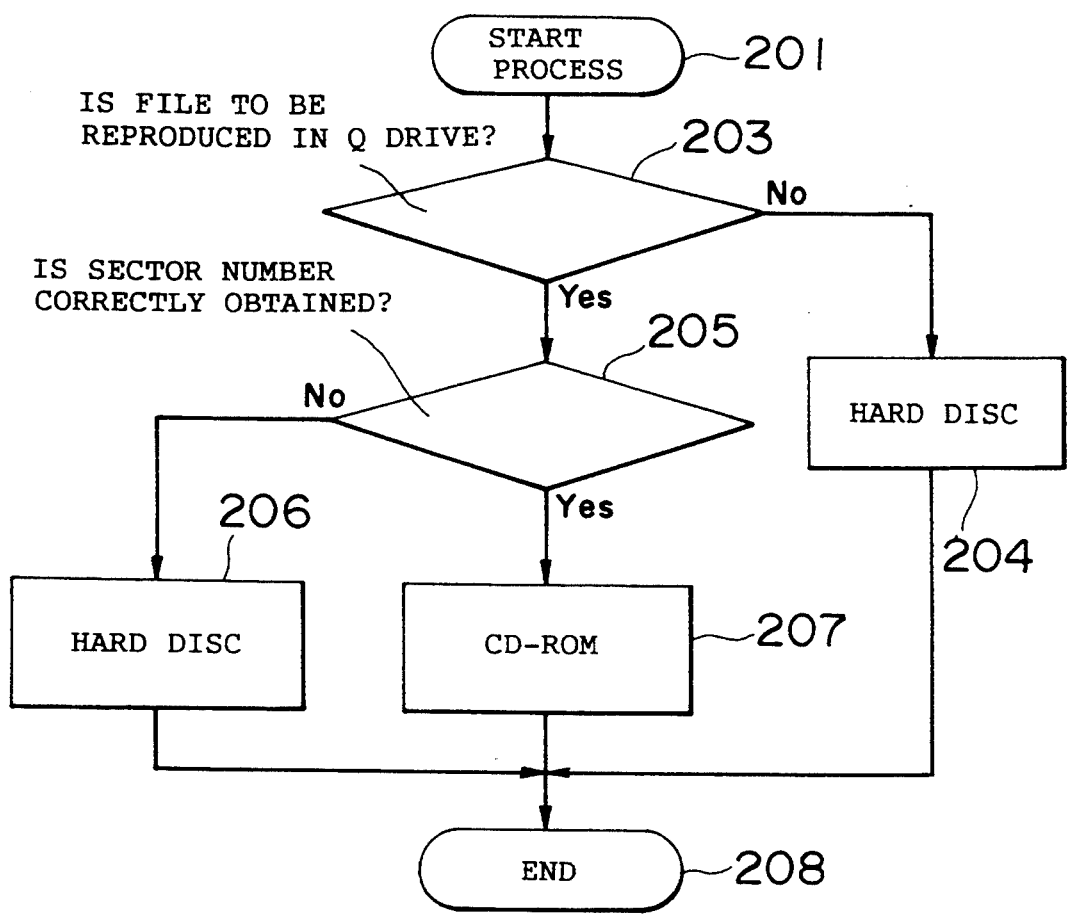
FIG. 6 is a flowchart of the process of another circuit.
Figure 7:
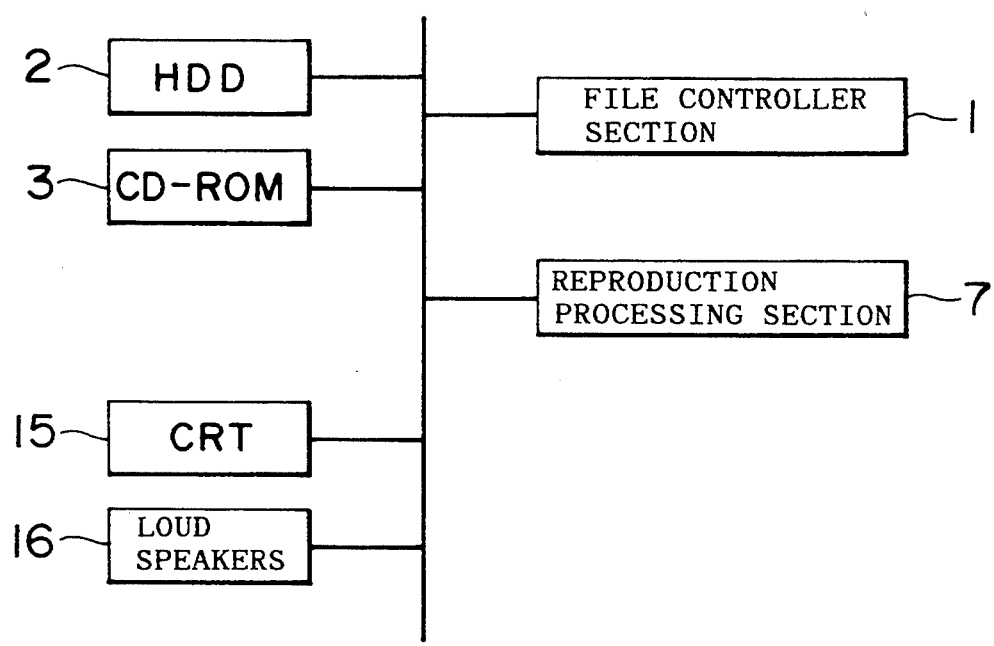
FIG. 7 is a diagram showing one embodiment of a prior art video data reproducing apparatus.

FIG. 6 is a flowchart showing the process of the decision circuit 6. Referring to FIG. 6, when the process is started (step 201), it is judged whether the file to be reproduced is present in the Q drive or not (step 203). If the file to be reproduced is not present in the Q drive, it is judged that the recording medium is the hard disc 2 (step 204) to thereby complete the process (step 208).

On the other hand, if the file to be produced is present in the Q drive, it is judged whether or not the sector number may be obtained on the CD-ROM 3 of the file to be produced (step 205).

Then, if the sector number could not be obtained, i.e., the operation is in error, it is judged that the medium should be the hard disc 2 (step 206), thereby completing the process (step 208).

On the other hand, if the sector number may be obtained in a normal manner, then it is judged that the medium is the CD-ROM 3 (step 207) to thereby complete the process (step 208).

When the process of step 208 is completed, the process is returned back to step 103.

Then, the file to be reproduced is present in the CD-ROM 3, the CD data reading section 5 judges whether or not the desired video and audio data are present in the reproduction buffer 51 as necessary information (step 104).

If the desired video and audio data are present in the reproduction buffer 51 as necessary information, the process is advanced to step 107. More specifically, the video and audio data stored in the reproduction buffer 51 are read out by the reproduction processing section 7, and the video processing section 71 converts the digitized video data into the analog video data, whereas the audio processing section 72 converts the digitized audio data into the analog audio data (step 107).

On the other hand, if the desired video and audio data are not present in the reproduction buffer 51, the CD data reading section 5 feeds out the above-described instant return command to the CD-ROM 3 (CD-ROM reading section) from the command section 52 prior to the motion picture reproduction process in the reproduction processing section 7. The video and audio data are transferred from the CD-ROM 3 to the reproduction buffer 51 in accordance with the instant return command (step 105).

Further, the CD data reading section 5 judges whether or not the desired video and audio data are inputted into the reproduction buffer 51 (step 106) and repeats its processing operation until the desired video and audio data are inputted into the reproduction buffer 51.

Then, if the desired video and audio data have been inputted into the reproduction buffer 51, the above-explained process is carried out in the reproduction processing section 7 in step 107. In the example shown in, FIG. 3, the video data of the block A are reproduced.

Subsequently, it is judged whether or not the processing operation of the video and audio data to be produced is completed (108). If the processing operation of the video and audio data to be reproduced from the CD-ROM 3 has not yet been completed, the processing operations of steps 103 and 104 will be carried out. In step 105, the CD data recording section 5 starts the inputting operation of the video and audio data of the latter block B into the reproduction buffer 51 before the reproduction process of the video and audio data of the former block A has been completed. Thereafter, the process of step 106 will be carried out. Then, in step 107, the desired video and audio data stored in the reproduction buffer 51 are to be reproduced.

Namely, even if the output transfer speed of the CD-ROM 3 is lower than the reproduction speed of the reproduction processing section 7, since the desired video and audio data to be reproduced are stored in advance in the reproduction buffer 51 before the reproducing process and the reproduction processing section 7 reads out the video and audio data of the reproduction buffer 51 in order, it is possible to reproduce the data in conformity with the real speed to be produced.

On the other hand, in the case where the file to be reproduced is present in the hard disc 2 in step 103, the desired video and audio data are read out into the HDD data recording section 4 from the hard disc 2 through the FAT file system including the file control program and the file allocation table 10 in the file controller section 1 (step 109).

For instance, as shown in FIG. 4, under the control of the FAT file system, the small block data A1-A5 and B1-B4 recorded in the hard disc 2 are read out at a high speed into the HDD data reading section 4 as the video data A and the audio data B, respectively.

When the process of the step 109 has been completed, the reproduction processing section 7 reads out the desired video and audio data from the HDD data reading section 4 and carries out the video reproduction process (step 107).

Namely, since the data are recorded at random in the hard disc 2 and the video data are read out under the control of the FAT file system of the file controller section 1 from the hard disc 2, the output transfer speed is at a high speed to well follow the reproduction speed. Thus, a suitable video reproduction may be insured.

Incidentally, if the reproduction of the desired video and audio data has not been effected, the operation is returned back to the step 103 to effect the processes from steps 104 to 107 in the case where, for instance, the desired video and audio data are present in the CD-ROM 3.

Accordingly, even if the desired video and audio data are present in any recording medium, it is possible to reproduce the desired video and audio data.

In the case where the desired video and audio data have been reproduced, all the steps are ended (step 110).

As described above, in accordance with the foregoing embodiment, in the case where the CD-ROM 3 is selected by the decision circuit 6, the CD data reading section 5 reads out the video data to the buffer memory 51 directly from the CD-ROM 3 without the intervention of the file controller section 1. The buffer memory 51 reads out the video data of the latter block-before the completion of the reproduction of the video data of the former block recorded in the CD-ROM 3 so that the data transfer from the buffer memory 51 to the reproduction processing section 7 may follow the reproduction speed.

On the other hand, in the case where the hard disc 2 is selected by the decision circuit 6, the HDD data reading section 4 reads out the data recorded in the hard disc 2 through the FAT file system of the file controller section 1, and the reproduction processing section 7 reproduces the data which have been read out to the HDD data reading section 4 so that the suitable video reproduction may be carried out irrespective of the recording format or the transfer speed of the recording media.

What is claimed is:

1. A video data reproducing apparatus for reproducing video data to images, said apparatus comprising:
   first recording means for dividing said video data into at least two first blocks, and for recording the at least two first blocks of said video data at random positions;
   second recording means for dividing said video data into at least two second blocks, and for recording the at least two second blocks of said video data; in serial positions;
   file controller means for controlling said video data recorded in said first recording means and divided into the at least two first blocks;
   first reading means for reading desired video data from said video data recorded in said first recording means;
   second reading means for reading desired video data from said video data recorded in said second recording means, said second reading means;
   a buffer memory to read video data of a later block recorded in said second recording means before completion of reproduction of video data of a former block recorded in said second recording means;
   decision means for selecting video data of one of said first recording means and said second recording means to be reproduced, wherein if said video data of said first recording means are selected, said video data recorded in said first recording means are read out through said file controller means, and if said video data of said second recording means is selected, said video data recorded in said second recording means are read out from said second recording means to said buffer memory without any intervention of said file controller means; and
   reproducing means for reproducing said video data read out by said one of said first recording means and said second recording means.

2. The apparatus according to claim 1, wherein said second reading means comprises:
   a command section to supply an instant return command to said second recording means before completion of a read-out of said video data from said second recording means into said buffer memory in response to a data reading command of said video data.

3. The apparatus according to claim 1, wherein said file controller means controls each block of said video data recorded in said first recording means in a cluster unit, said file controller means having a file allocation table for storing cluster numbers indicative of how respective clusters are connected to each other in order, thereby controlling the respective clusters.

4. The apparatus according to claim 1, wherein said first recording means comprises one of a magnetic disc and a magneto-optical disc with a recording content which may be one of rewritten and newly written.

5. The apparatus according to claim 1, wherein said decision means comprises means for recognizing a presence/absence of said first and second recording means and for reading out data with priority from a corresponding one of said first and second recording means when said presence/absence is recognized.

6. The apparatus according to claim 1, wherein said second recording means comprises a large capacity recording medium, especially for reading said video data, onto which said video data may not be rewritten and additionally written.

7. The apparatus according to claim 6, wherein said large capacity recording medium comprises a CD-ROM.

8. The apparatus as claimed in claim 7, wherein said decision means determines whether to read said video data from said CD-ROM, determines whether a sector number corresponding to said video data to be reproduced from said CD-ROM is obtainable, and if not, determines that said video data recorded on said first recording means is to be reproduced.

9. A video data reproducing apparatus for reproducing video data to generate a motion picture, said apparatus comprising:
first recording means for dividing said video data into a first plurality of blocks recorded at random positions;
second recording means for dividing said video data into a second plurality of blocks recorded in serial positions;
file controller means for controlling said video data divided into said first plurality of blocks and recorded in said first recording means;
first reading means for reading desired first data from said video data recorded in said first recording means;
second reading means for reading desired second data from said video data recorded in said second recording means;
decision means determining which of said first and second data should be read by said first and second reading means, wherein if said first data should be read out, said first data are read out through said file controller means, and if said second data should be read out, said second data are read out without the use of said file controller means;
reproducing means for reproducing and displaying said first and second data read out from said corresponding first and second recording means; and
a buffer memory to store said second data read out from said second recording means, and to read out said second data in said second plurality of blocks, wherein a latter block of said stored second data are read out before completion of reproduction and display of a former block by said reproducing means.

10. The apparatus as claimed in claim 9, wherein said first and second recording means record audio data corresponding to said video data recorded on a same one of said first and second recording means.

11. The apparatus as claimed in claim 9, wherein said second reading means generates and outputs an instant return command, in response to an appropriate data read command from a user, to said second recording means to read out said second data from said second recording means to said buffer memory if said second data are not present in said buffer memory.

12. The apparatus as claimed in claim 1, wherein said buffer memory is part of said second reading means.

13. A method of reproducing video data to generate images, said method comprising:
recording said video data on at least one of a first recording medium which stores said video data in first blocks at random positions as first data and a second recording medium which stores said video data in second blocks in serial positions as second data;
selecting one of said first data and said second data to be reproduced;
reading said selected one of said first and second data from the corresponding first and second recording medium, and if said first data is selected, using a file controller to control the read out of said first data, and if said second data is selected, the file controller is not used to control the read out of said second data;
if selected, storing said second data in a buffer and then reading out said second data from the buffer in the second blocks; and
reproducing said second data, wherein a later one of the second blocks is read out of the buffer before completion of said reproducing of a former one of the second blocks.

14. The method as claimed in claim 13, said step of selecting one of said first data and said second data further comprises:
making a first determination whether a file of said second data is in a particular drive;
making a second determination whether a sector number of the file is obtainable from the second recording medium if said first determination is positive and selecting said first data if said first determination is negative; and
selecting said second data if said second determination is positive and selecting said first data if said second determination is negative.

15. The method as claimed in claim 13, further comprising:
making a determination whether the buffer contains said second data; and
if said determination is negative, issuing an instant return command to the second recording medium to send said second data to the buffer before completion of said reading out from the buffer.

* * * * *

UNITED STATES PATENT AND TRADEMARK OFFICE
CERTIFICATE OF CORRECTION

PATENT NO. : 5,452,097

DATED : September 19, 1995

INVENTOR(S) : Yuzuru KOGA et al.

It is certified that error appears in the above-indentified patent and that said Letters Patent is hereby corrected as shown below:

Column 5, line 29, after "and" insert --a--.

Column 8, line 1, after "data" delete ";".

Signed and Sealed this

Fifth Day of March, 1996

Attest:

BRUCE LEHMAN

Attesting Officer

Commissioner of Patents and Trademarks